(12) United States Patent
Ohba

(10) Patent No.: US 6,172,951 B1
(45) Date of Patent: Jan. 9, 2001

(54) CD ENCODE DEVICE FOR OPTICAL DISK DRIVE

(75) Inventor: Setsuo Ohba, Tokyo (JP)

(73) Assignee: Ricoh Company, Ltd., Tokyo (JP)

(*) Notice: Under 35 U.S.C. 154(b), the term of this patent shall be extended for 0 days.

(21) Appl. No.: 09/054,516

(22) Filed: Apr. 3, 1998

(30) Foreign Application Priority Data

Apr. 5, 1997 (JP) .................................................. 9-102619

(51) Int. Cl.$^7$ ........................................................ G11B 7/00
(52) U.S. Cl. .................................................................. 369/48
(58) Field of Search ................................ 369/47, 48, 59, 369/124

(56) References Cited

U.S. PATENT DOCUMENTS

| | | |
|---|---|---|
| 4,550,345 | * 10/1985 | Terada et al. ..................... 369/73.07 |
| 4,937,809 | 6/1990 | Miyadera et al. . |
| 5,111,443 | 5/1992 | Yokogawa . |
| 5,524,103 | * 6/1996 | Shimizu et al. ........................ 369/59 |
| 5,528,574 | 6/1996 | Takeuchi et al. ...................... 369/50 |
| 5,574,710 | 11/1996 | Kimura et al. ......................... 369/60 |

FOREIGN PATENT DOCUMENTS

| | | |
|---|---|---|
| 0 414 557 A2 | 2/1991 | (EP) . |
| 0 485 234 A2 | 5/1992 | (EP) . |
| 0 684 606 A2 | 11/1995 | (EP) . |

* cited by examiner

Primary Examiner—Nabil Hindi
(74) Attorney, Agent, or Firm—Dickstein Shapiro Morin & Oshinsky LLP

(57) ABSTRACT

A CD encode device for a recordable optical disk includes a clock synthesizer multiplying, by M/N, a CD decode system clock, a clock having a frequency equal to $2^n$ times or $\frac{1}{2}^n$ times a frequency of the CD decode system clock, a clock obtained by the above multiplying functioning as a channel clock required during a write operation where M, N and n are respectively integers.

2 Claims, 18 Drawing Sheets

FIG. 5

| PIN NAME | TYPE | DESCRIPTION |
|---|---|---|
| | | CD ENCODER INTERFACE PIN DESCRIPTIONS |
| WBLIN | IN | WOBBLE IN: BINARIZED WOBBLE INPUT |
| ATIPIO | I/O | ATIP: ATIP SIGNAL AFTER FSK DEMODULATION. ATIP SIGNAL INPUT WHEN EXTERNAL FSK |
| ATIPCK | I/O | ATIP CLOCK: ATIP DATA STROBE CLOCK. ATIP CLK SIGNAL INPUT WHEN EXTERNAL FSK |
| ASYNC | OUT | ATIP SYNC: DETECTED ATIP SYNC |
| WGATE | OUT | WRITE GATE: |
| HFSW | OUT | HIGH FREQUENCY: HIGH FREQUENCY SUPERIMPOSED SWITCH |
| PANICIN | IN | PANIC IN: PANIC INPUT |
| EFM1 | OUT | EFM1: EFM SIGNAL |
| EFM2 | OUT | EFM2: EFM PEAK PULSE |
| EEFMNT1 | OUT | EFM NT1: EFM BIT PATTERN LENGTH INDICATOR |
| EEFMNT2 | OUT | EFM NT2: EFM BIT PATTERN LENGTH INDICATOR |
| EEFMNT3 | OUT | EFM NT3: EFM BIT PATTERN LENGTH INDICATOR |
| EEFMNT4 | OUT | EFM NT4: EFM BIT PATTERN LENGTH INDICATOR |
| E11TP | OUT | EFM 11T PIT PATTERN: EFM11T BIT PATTERN INDICATOR |
| E11TS | OUT | EFM 11T SPACE PATTERN: EFM11T SPACE PATTERN INDICATOR |
| EFCK | OUT | EFM BIT CLOCK: EFM BIT CLOCK SIGNAL GENERATED FROM INTERNAL CLOCK IN CD ENCODER |
| ESFS | OUT | ENCODER SUBCODE FRAME SYNC: SUBCODE FRAME SYNC SIGNAL GENERATED FROM INTERNAL CLOCK IN CD ENCODER |
| EEFS | OUT | ENCODER EFM SYNC: EFM SYNC SIGNAL GENERATED FROM INTERNAL CLOCK IN CD ENCODER |
| RESMP | OUT | READ LEVEL SAMPLE: SIGNAL FOR SAMPLE & HOLD READ LEVEL IN RECODING |
| ROPC1 | OUT | RUNNING OPC1: SIGNAL 1 FOR SAMPLE & HOLD FOR PERFORMING RUNNING OPC IN RECODING |
| ROPC2 | OUT | RUNNING OPC2: SIGNAL 2 FOR SAMPLE & HOLD FOR PERFORMING RUNNING OPC IN RECODING |

FIG. 16A

| BIT | CODE | CONTENTS | 1 | 0 | RES |
|---|---|---|---|---|---|
| 7..5 | NMINUS1T | SETTING OF STRATEGY CONVERSION FOR EFM1 OUTPUT | AS BELOW | | 0 |
| 4..2 | 3TAMEND | SETTING OF PEAK PULSE WIDTH FOR 3T PULSE | AS BELOW | | 0 |
| 1..0 | | (RESERVED) | | | |

FIG. 16B

| BIT 7 | BIT 6 | BIT 5 | FUNCTION |
|---|---|---|---|
| 0 | 0 | 0 | OUTPUT EFM1 OF LENGTH nT |
| 0 | 0 | 1 | OUTPUT EFM1 OF LENGTH (n-0.25) |
| 0 | 1 | 0 | OUTPUT EFM1 OF LENGTH (n-0.5) |
| 0 | 1 | 1 | OUTPUT EFM1 OF LENGTH (n-0.75) |
| 1 | 0 | 0 | OUTPUT EFM1 OF LENGTH (n-1) |
| 1 | 0 | 1 | OUTPUT EFM1 OF LENGTH (n-1.25) |
| 1 | 1 | 0 | (RESERVED) |
| 1 | 1 | 1 | (RESERVED) |

FIG. 16C

| BIT 4 | BIT 3 | BIT 2 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | SET PEAK PULSE WIDTH TO 1.75T |
| 1 | 1 | 0 | SET PEAK PULSE WIDTH TO 2T |

FIG. 17A

| BIT | CODE | CONTENTS | 1 | 0 | RES |
|---|---|---|---|---|---|
| 7..5 | 4TAMEND | SETTING OF PEAK PULSE WIDTH FOR 4T PULSE | AS BELOW | | 0 |
| 4..2 | NTAMEND | SETTING OF PEAK PULSE WIDTH FOR PULSE OTHER THAN 3T, 4T | AS BELOW | | 0 |
| | | (RESERVED) | | | |

FIG. 17B

| BIT 7 | BIT 6 | BIT 5 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | SET PEAK PULSE WIDTH TO 1.75T |
| 1 | 1 | 0 | SET PEAK PULSE WIDTH TO 2T |

FIG. 17C

| BIT 4 | BIT 3 | BIT 2 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | SET PEAK PULSE WIDTH TO 1.75T |
| 1 | 1 | 0 | SET PEAK PULSE WIDTH TO 2T |

FIG. 22A

| BIT | CODE | CONTENTS | 1 | 0 | RES |
|---|---|---|---|---|---|
| 7..5 | 3TPeak | SETTING OF LEADING PEAK PULSE WIDTH FOR 3T PULSE | AS BELOW | | 0 |
| 4..3 | 3TPulsWid | SETTING OF INTERMEDIATE PULSE WIDTH FOR 3T PULSE | AS BELOW | | 0 |
| 2..0 | 3TOffPuls | SETTING OF TRAILING OFF PULSE WIDTH FOR 3T PULSE | AS BELOW | | 0 |

FIG. 22B

| BIT 7 | BIT 6 | BIT 5 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | (RESERVED) |
| 1 | 1 | 0 | (RESERVED) |

FIG. 22C

| BIT 4 | BIT 3 | FUNCTION |
|---|---|---|
| 0 | 0 | SET INTERMEDIATE PULSE WIDTH TO 0.25T |
| 0 | 1 | SET INTERMEDIATE PULSE WIDTH TO 0.5T |
| 1 | 0 | SET INTERMEDIATE PULSE WIDTH TO 0.75T |
| 1 | 1 | SET INTERMEDIATE PULSE WIDTH TO 1.0T |

FIG. 22D

| BIT 2 | BIT 1 | BIT 0 | FUNCTION |
|---|---|---|---|
| 0 | 0 | 0 | SET OFF PULSE WIDTH TO 0.25T |
| 0 | 0 | 1 | SET OFF PULSE WIDTH TO 0.5T |
| 0 | 1 | 0 | SET OFF PULSE WIDTH TO 0.75T |
| 0 | 1 | 1 | SET OFF PULSE WIDTH TO 1T |
| 1 | 0 | 0 | SET OFF PULSE WIDTH TO 1.25T |
| 1 | 0 | 1 | SET OFF PULSE WIDTH TO 1.5T |
| 1 | 1 | 0 | (RESERVED) |

FIG. 23A

| BIT | CODE | CONTENTS | 1 | 0 | RES |
|---|---|---|---|---|---|
| 7..5 | 4TPeak | SETTING OF LEADING PEAK PULSE WIDTH FOR 4T PULSE | AS BELOW | | 0 |
| 4.3 | 4TPulsWid | SETTING OF INTERMEDIATE PULSE WIDTH FOR 4T PULSE | AS BELOW | | 0 |
| 2..0 | 4TOffPuls | SETTING OF TRAILING OFF PULSE WIDTH FOR 4T PULSE | AS BELOW | | 0 |

FIG. 23B

| BIT 7 | BIT 6 | BIT 5 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | (RESERVED) |
| 1 | 1 | 0 | (RESERVED) |

FIG. 23C

| BIT 4 | BIT 3 | FUNCTION |
|---|---|---|
| 0 | 0 | SET INTERMEDIATE PULSE WIDTH TO 0.25T |
| 0 | 1 | SET INTERMEDIATE PULSE WIDTH TO 0.5T |
| 1 | 0 | SET INTERMEDIATE PULSE WIDTH TO 0.75T |
| 1 | 1 | SET INTERMEDIATE PULSE WIDTH TO 1.0T |

FIG. 23D

| BIT 2 | BIT 1 | BIT 0 | FUNCTION |
|---|---|---|---|
| 0 | 0 | 0 | SET OFF PULSE WIDTH TO 0.25T |
| 0 | 0 | 1 | SET OFF PULSE WIDTH TO 0.5T |
| 0 | 1 | 0 | SET OFF PULSE WIDTH TO 0.75T |
| 0 | 1 | 1 | SET OFF PULSE WIDTH TO 1T |
| 1 | 0 | 0 | SET OFF PULSE WIDTH TO 1.25T |
| 1 | 0 | 1 | SET OFF PULSE WIDTH TO 1.5T |
| 1 | 1 | 0 | (RESERVED) |

FIG. 24A

| BIT | CODE | CONTENTS | 1 | 0 | RES |
|---|---|---|---|---|---|
| 7..5 | NTPeak | SETTING OF LEADING PEAK PULSE WIDTH FOR 5~11T PULSE | AS BELOW | | 0 |
| 4.3 | NTPulsWid | SETTING OF INTERMEDIATE PULSE WIDTH FOR 5~11T PULSE | AS BELOW | | 0 |
| 2..0 | NTOffPuls | SETTING OF TRAILING OFF PULSE WIDTH FOR 5~11T PULSE | AS BELOW | | 0 |

FIG. 24B

| BIT 7 | BIT 6 | BIT 5 | FUNCTION |
|---|---|---|---|
| 0 | 0 | 0 | SET PEAK PULSE WIDTH TO 0.5T |
| 0 | 0 | 1 | SET PEAK PULSE WIDTH TO 0.75T |
| 0 | 1 | 0 | SET PEAK PULSE WIDTH TO 1T |
| 0 | 1 | 1 | SET PEAK PULSE WIDTH TO 1.25T |
| 1 | 0 | 0 | SET PEAK PULSE WIDTH TO 1.5T |
| 1 | 0 | 1 | (RESERVED) |
| 1 | 1 | 0 | (RESERVED) |

FIG. 24C

| BIT 4 | BIT 3 | FUNCTION |
|---|---|---|
| 0 | 0 | SET INTERMEDIATE PULSE WIDTH TO 0.25T |
| 0 | 1 | SET INTERMEDIATE PULSE WIDTH TO 0.5T |
| 1 | 0 | SET INTERMEDIATE PULSE WIDTH TO 0.75T |
| 1 | 1 | SET INTERMEDIATE PULSE WIDTH TO 1.0T |

FIG. 24D

| BIT 2 | BIT 1 | BIT 0 | FUNCTION |
|---|---|---|---|
| 0 | 0 | 0 | SET OFF PULSE WIDTH TO 0.25T |
| 0 | 0 | 1 | SET OFF PULSE WIDTH TO 0.5T |
| 0 | 1 | 0 | SET OFF PULSE WIDTH TO 0.75T |
| 0 | 1 | 1 | SET OFF PULSE WIDTH TO 1T |
| 1 | 0 | 0 | SET OFF PULSE WIDTH TO 1.25T |
| 1 | 0 | 1 | SET OFF PULSE WIDTH TO 1.5T |
| 1 | 1 | 0 | (RESERVED) |

CD ENCODE DEVICE FOR OPTICAL DISK DRIVE

BACKGROUND OF THE INVENTION

1. Field of the Invention

The present invention relates to an optical disk drive which drives a recordable optical disk, and more particularly to a CD encode device for such an optical disk drive.

2. Description of the Related Art

An optical disk is widely used as a device capable of storing a huge amount of information.

First, a description will be given of an outline of an optical disk and a drive structure.

General CD-R and CD-E disks are writable (recordable) CDs (Compact Disks). The CD-R (CD Recordable) is a CD on which information can be recorded only once (also called CD-Write Once). The CD-E (CD Erasable) is a CD on which information can repeatedly be recorded a plurality of numbers of times (also called CD-RW: CD ReWritable). Information can be recorded on and reproduced from the CD-R and CD-E, namely, optical disks by means of a drive as shown in FIG. 1.

FIG. 1 is a function block diagram of an optical disk drive. The optical disk drive is made up of an optical disk 1, a spindle motor 2, an optical pickup, a motor driver 4, a read amplifier 5, a servo unit 6, a CD decoder 7, an ATIP (Absolute Time In Pre-groove) decoder 8, a laser controller 9, a CD encoder 10, a CD-ROM encoder 11, a buffer RAM 12, a buffer manager 13, a CD-ROM decoder 14, an ATAPI/SCSI interface 15, a D/A converter 16, a ROM 17, a CPU 18 and RAM 19. In FIG. 1, a symbol LB indicates a laser beam, and Audio denotes an audio output signal.

The arrows shown in FIG. 1 generally indicate the directions of flows of data. For the sake of simplicity, FIG. 1 is illustrated so that a thick solid line extends from the CPU 18 for controlling the blocks and thus individual lines provided between the CPU 18 and the blocks are omitted.

The structure and operation of the optical disk drive are as follows.

The optical disk 1 is driven to be rotated by the spindle motor 2, which is regulated at a constant linear velocity by the motor driver 4 and the servo unit 5. The linear velocity can be changed stepwisely. The optical pickup 3 includes a semiconductor laser diode, an optical system, a focus actuator, a track actuator, a light-receiving element and a position sensor, these built-in components being not depicted. The optical pickup 3 projects the laser beam LB onto the optical disk 1. The optical pickup 3 can be transported in the sledge direction by a seek motor. The focus actuator, the track actuator and the seek motor are controlled so that, based on the signals from the light-receiving element and the position sensor, the spot of the laser beam LB is located on the target position by the motor driver 4 and the servo unit 5.

At the time of a read operation, a reproduced signal obtained by the optical pickup 3 is amplified by the read amplifier 5 and is binarized. The resultant binarized reproduced signal is input to the CD decoder 7. The input binarized data is subjected to an EFM (Eight to Fourteen Modulation) process by the CD decoder 7. The data recorded on the optical disk 1 is obtained by an EFM modulation which is carried out every eight bits. In the EFM modulation, eight-bit data is converted into fourteen-bit data, to which three associated bits are added, so that the total number of bits are 17. The associated bits are given so that the number of bits "1" and the number of bits "0" appearing up to now is equal to each other in average. This is called "suppression of DC component", and a variation in the slice level of the reproduced signal from which the DC component is cut off can be suppressed.

The demodulated data is then subjected to deinterleave and error correction processes.

Then, the resultant data is input to the CD-ROM decoder 14 and is further subjected to an error correction in order to enhance the reliability of the demodulated data.

The data obtained by the two error correction processes is temporarily stored in the buffer RAM 12 by the buffer manager 13. When the amount of data sufficient to form sector data is available in the buffer RAM 12, the data is transferred to a host computer (not shown) via the ATAPI/SCSI interface 15 without interruption.

If the data is music data, the data output from the CD decoder 7 is input to the D/A converter 16, and is output as analog audio signal.

At the time of a write operation, data supplied from the host computer through the ATAPI/SCSI interface 15 is temporarily stored in the buffer RAM 12 by the buffer manager 13. When a certain amount of data becomes available in the buffer RAM 12, the write operation is started. In this case, it is required to move the laser spot to a write starting position. This write starting position can be obtained from a Wobble signal that is stamped beforehand on the optical disk 1 by snaking of tracks.

The Wobble signal includes absolute time information called ATIP, which is extracted by the ATIP decoder 8. A synchronizing signal generated by the ATIP decoder 8 is input to the CD encoder 10, whereby the writing of data can be carried out at the correct position on the optical disk 1.

The data stored in the buffer RAM 12 is subjected to an error correction adding process and an interleave process by the CD-ROM encoder 11 and the CD encoder 10, and is then recorded on the optical disk 1 through the laser controller 9 and the optical pickup 3.

The EFM modulated data drives, as a bit stream, the laser diode at a channel bit rate of 4.3218 Mbps (standard bit rate). In this case, the recorded data forms an EFM frame every 588 channel bits. A channel clock is defined as a clock of the frequency equal to that of the channel bits.

The above is the outline of the structure and operation of the optical disk drive shown in FIG. 1.

A one-chip LSI device used for an optical disk, for example, used in the CD-F drive has been marketed (for example, LC8959 manufactured by SANYO DENKI KABUSIKI KAISHA). The one-chip LSI device includes a CD decode system circuit (which processes a signal read from the disk) and a CD encode system circuit (which processes a signal based on write data to be actually written onto the disk). The CD decode system circuit and the CD encode system circuit operate in synchronism with respective different clock signals. That is, the one-chip LSI device requires two different clock signals.

Generally, two oscillation elements are required to generate the two different clock signals. Since oscillation elements are not less expensive, the use of the above one-chip LSI device increases the production cost.

SUMMARY OF THE INVENTION

It is a general object of the present invention to eliminate the above disadvantage.

A more specific object of the present invention is to generate clock signals to be used in a one-chip LSI device for the CD-R drives by a single common oscillation element and to thus reduce the production cost.

The above objects of the present invention are achieved by a CD encode device for a recordable optical disk comprising a clock synthesizer multiplying, by M/N, a CD decode system clock, a clock having a frequency equal to $2^n$ times or $\frac{1}{2}^n$ times a frequency of the CD decode system clock, a clock obtained by the above multiplying functioning as a channel clock required during a write operation where M, N and n are respectively integers. Hence, the CD decode system and the CD encode system can commonly use a single oscillation element and can realize reduction of the production cost.

The above objects of the present invention are also achieved by a CD encode device for a recordable optical disk comprising: a clock synthesizer generating a clock having a frequency equal to $2^n$ times a frequency of a channel clock required during a write operation from another clock used in a CD decode system circuit, where n is an integer; and a frequency divider which frequency-divides the clock generated by the clock synthesizer at given frequency dividing ratios, so that clocks having different frequencies can be generated. Hence, it is possible to cope with variable recording using the frequency of the channel clock, a twice frequency, a four-times frequency, an eight-times frequency, . . . , or $2^n$-times frequency.

The above objects of the present invention are also achieved by a CD encode device for a recordable optical disk comprising: a clock synthesizer generating a clock having a frequency equal to (m×$2^n$) times a frequency of a channel clock required during a write operation from another clock used in a CD decode system circuit, where m and n are respectively integers; and a frequency divider which frequency-divides the clock generated by the clock synthesizer at given frequency dividing ratios, so that clocks having different frequencies can be generated. Hence, it is possible to cope with variable recording using the three-times frequency, six-times frequency, twelve-times frequency, . . . , or 3×($2^n$) times frequency.

The above-mentioned objects of the present invention are also achieved by a CD encode device for a recordable optical disk comprising: a clock synthesizer generating a block having a frequency equal to twice a frequency of a channel clock required during a write operation from another clock used in a CD decode system circuit; and a pulse width correction circuit which corrects a write pulse width in a pulse width unit corresponding to leading and trailing edges of the clock generated by the clock synthesizer. It is possible to omit an external circuit for fine correction to the write strategy defined in the orange book and to provide less-expensive, simple devices.

The above objects of the present invention are achieved by a CD encode device for a recordable optical disk comprising a clock synthesizer generating control signals for a write strategy and including a pulse width correction circuit which can independently correct pulse widths of the control signals in a pulse width unit corresponding to leading and trailing edges of a clock having a frequency equal to twice a frequency of a channel clock, so that pulse-width-corrected control signals can be used for encoding at different frequencies. Hence, it is possible to omit an external circuit for fine correction to the write strategy defined in the orange book and provide less-expensive, simple, excellent writing performance devices.

The above objects of the present invention are achieved by a CD encode device for a recordable optical disk comprising a clock synthesizer generating control signals for a write strategy and including a pulse width correction circuit which can independently correct pulse widths of the control signals in a pulse width unit corresponding to leading and trailing edges of a clock having a frequency equal to twice a frequency of a channel clock, the pulse width correction circuit also correcting pulse widths of intermediate pulses of a generated pulse in said pulse width unit, so that pulse-width-corrected control signals can be used for encoding at different frequencies. Hence, it is possible to omit an external circuit for fine correction to the write strategy defined in the orange book and provide less-expensive, simple, excellent writing performance CDR/CD-E devices without a particular load to a CPU.

BRIEF DESCRIPTION OF THE DRAWINGS

Other objects, features and advantages of the present invention will become more apparent from the following detailed description when read in conjunction with the accompanying drawings, in which:

FIG. 5 is a diagram of interface signals related to pins of the CD encode device shown in FIG. 4;

FIGS. 16A, 16B and 16C are diagrams setting of signals output to terminals EFM1 and EFM2 by a strategy conversion for an internal EFM signal;

FIGS. 17A, 17B and 17C are diagrams setting of signals output to the terminal EFM2 by a strategy conversion for an internal EFM signal;

FIGS. 22A, 22B, 22C and 22D are diagrams of setting of a peal pulse width, an intermediate pulse width and an off pulse width output by the strategy conversion carried out when the internal EFM signal is 3T;

FIGS. 23A, 23B, 23C and 23D are diagrams of setting of a peal pulse width, an intermediate pulse width and an off pulse width output by the strategy conversion carried out when the internal EFM signal is 4T; and FIGS. 24A, 24B, 24C and 24D are diagrams of setting of a peal pulse width, an intermediate pulse width and an off pulse width output by the strategy conversion carried out when the internal EFM signal is 5T–11T.

DESCRIPTION OF THE PREFERRED EMBODIMENTS

A description will now be given of a first embodiment of the present invention.

The first embodiment is primarily directed to multiplying, by M/N times, a CD decode system clock a clock of a frequency equal to 2 to nth power ($2^n$) times the frequency of the DC decode system clock or a clock of a frequency equal to $\frac{1}{2}^2$ times the frequency of the DC decode system clock, so that the CD encode system clock or the channel clock necessary for the write operation can be generated. The first embodiment is secondarily directed to making a VCO (Voltage Controlled Oscillator) generate a clock of a frequency equal to $2^n$ times the channel clock and frequency-dividing the above clock by a frequency divider. In the above, n, M and N are respectively arbitrary integers.

With the above structure, it is possible to generate the CD decode system clock and the CD encode clock by using only a single oscillation element and to thus reduce the production cost.

First, a description will be given of a one-chip LSI device which includes the CD encode device of the present invention, namely a one-chip LSI device suitable for a clock synthesizer generating the CD encode system clock from the CD decode system clock.

Figure 1:
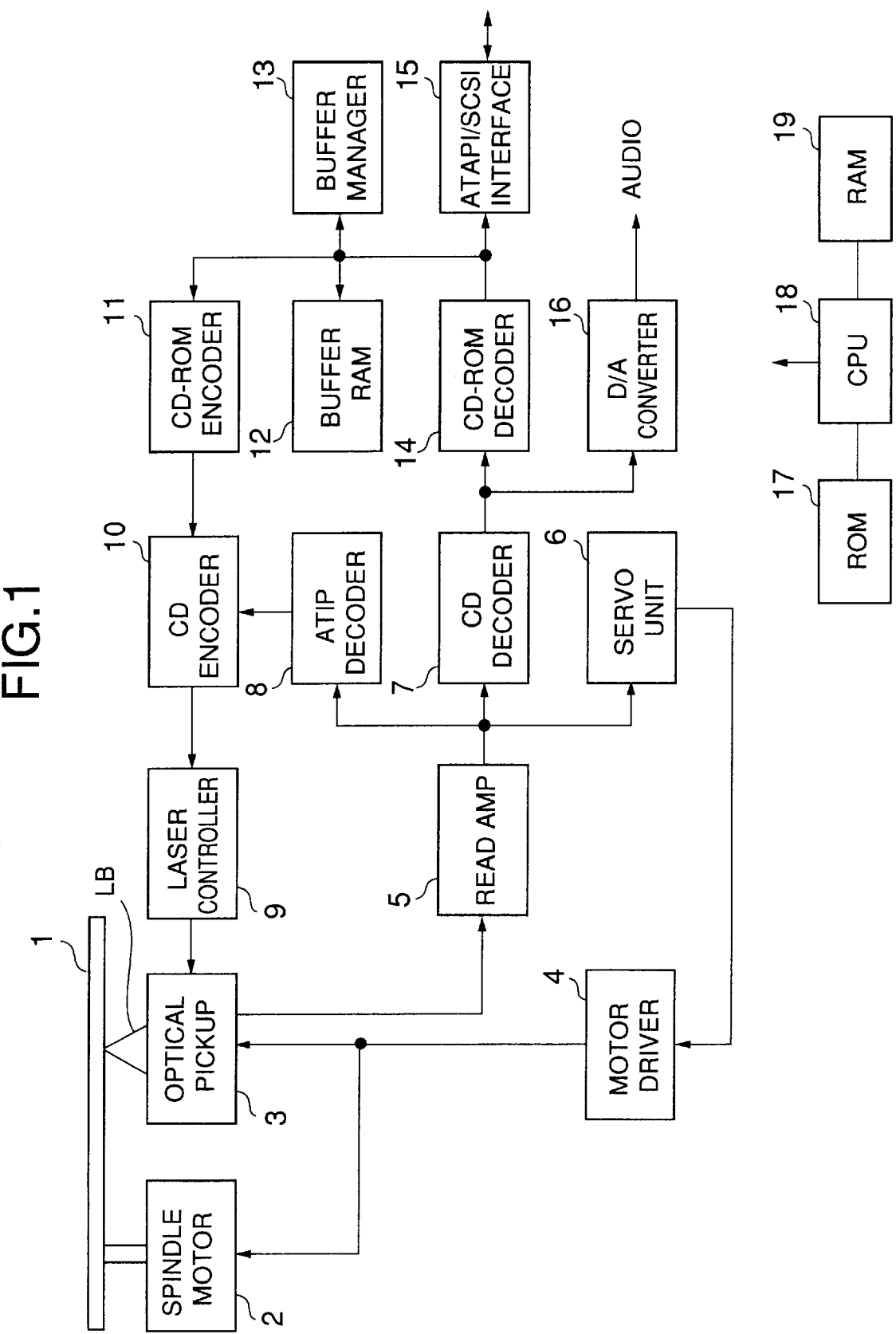
FIG. 1 is a block diagram of a conventional optical disk drive.
Figure 2:
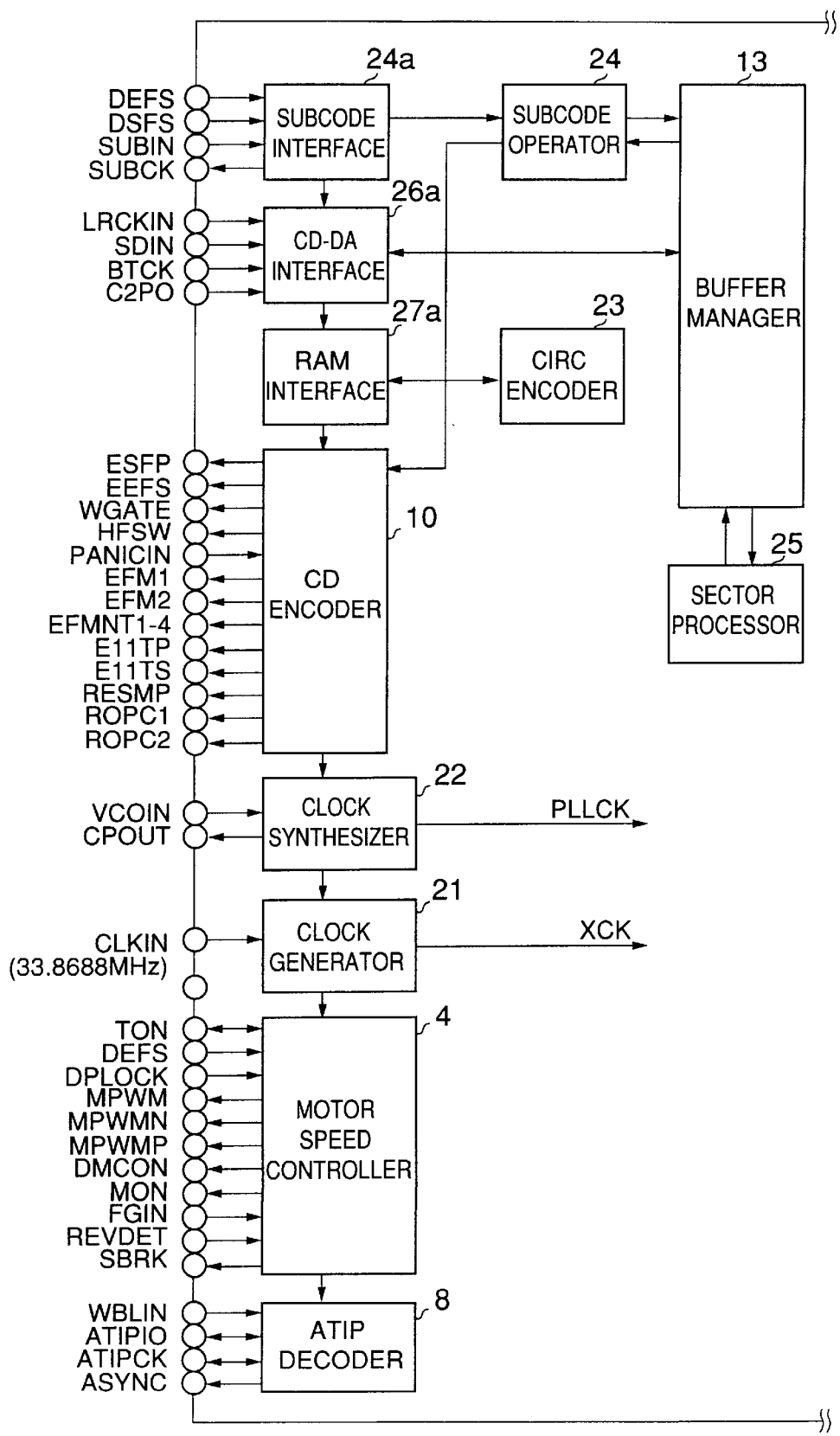
FIG. 2 is a block diagram of a one-chip LSI having an EFM encode function and a CD-ROM encode/decode function.
Figure 3:
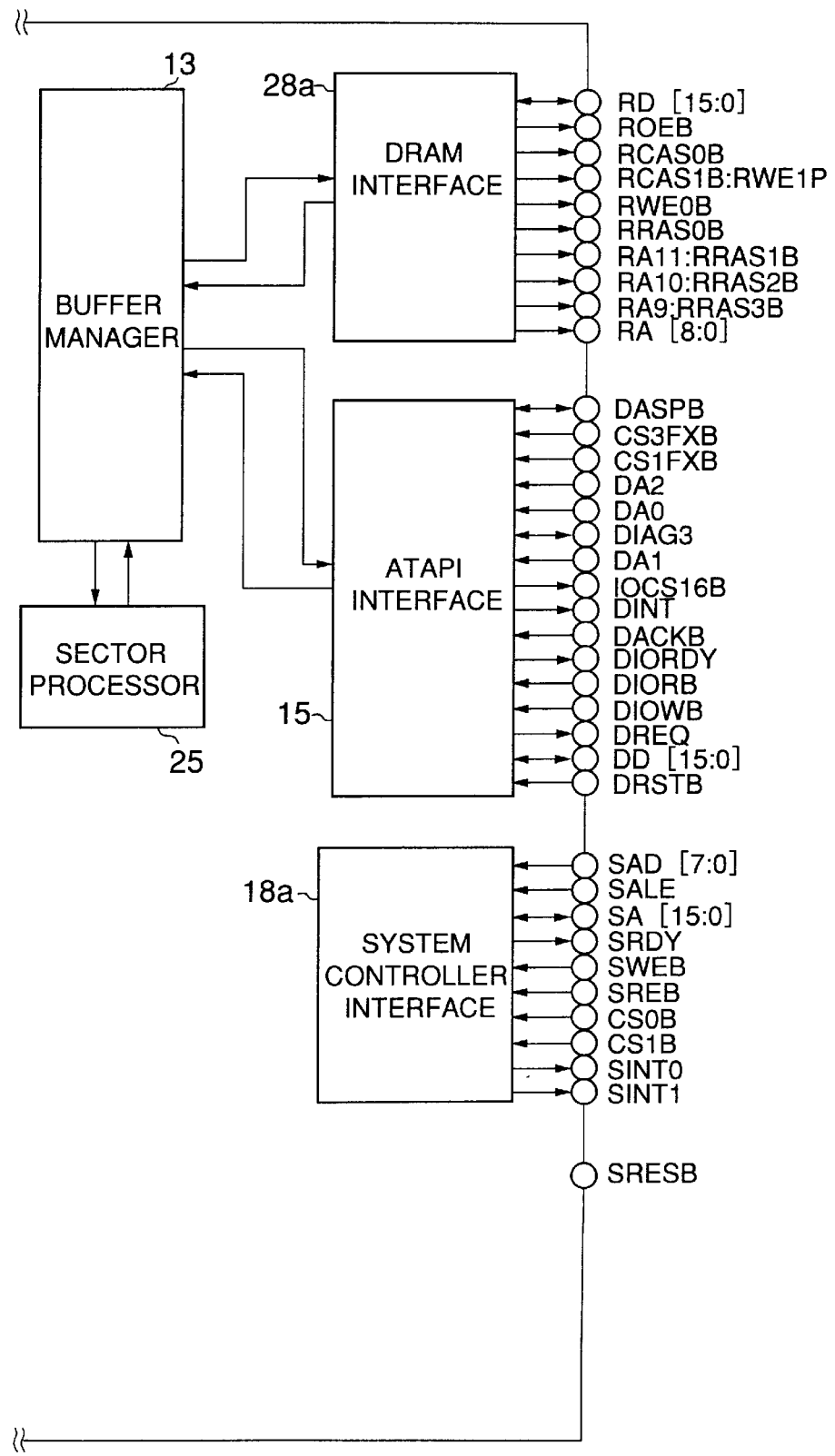
FIG. 3 is another block diagram of the one-chip LSI having the EFM encode function and the CD-ROM encode/decode function.

FIGS. 2 and 3 are block diagrams of a one-chip LSI device having the EFM encode function and the CD-ROM encode.decode function. In these figures, parts that are the same as those shown in FIG. 1 are given the same reference numbers, and an interface is assigned a suffix "a". The one-chip LSI device shown in FIGS. 2 and 3 includes a clock generator 21, a clock synthesizer 22, a CIRC encoder 23, a subcode operator 24, a sector processor 25, a CD-DA interface 26a, a RAM interface 27a and a DRAM interface 28a.

In the one-chip LSI device having the EFM encode function and the CD-ROM encode/decode function shown in FIGS. 2 and 3, the EFM encode function and the CD-ROM encode/decode function of the optical disk drive shown in FIG. 24 are implemented in LSI formation.

A read/write data process circuit is configured by a subcode interface 24a, a CD-DA interface 26a, the CD encoder 10, the buffer manager 13, a sector processor 25, a DRAM interface 28a, an ATAPI interface 15a and a system controller 18a.

The system controller 18a includes a group of registers into which instructions from the CPU 18 shown in FIG. 1 to the one-chip LSI device are written and from which data indicating internal states of the one-chip LSI device.

The CD encode device of the present invention is directly related to the CD encoder 10, the clock generator 21 and the clock synthesizer 22 in the blocks shown in FIGS. 2 and 3.

A further description will be given of the above components with reference to FIG. 4.

Figure 4:
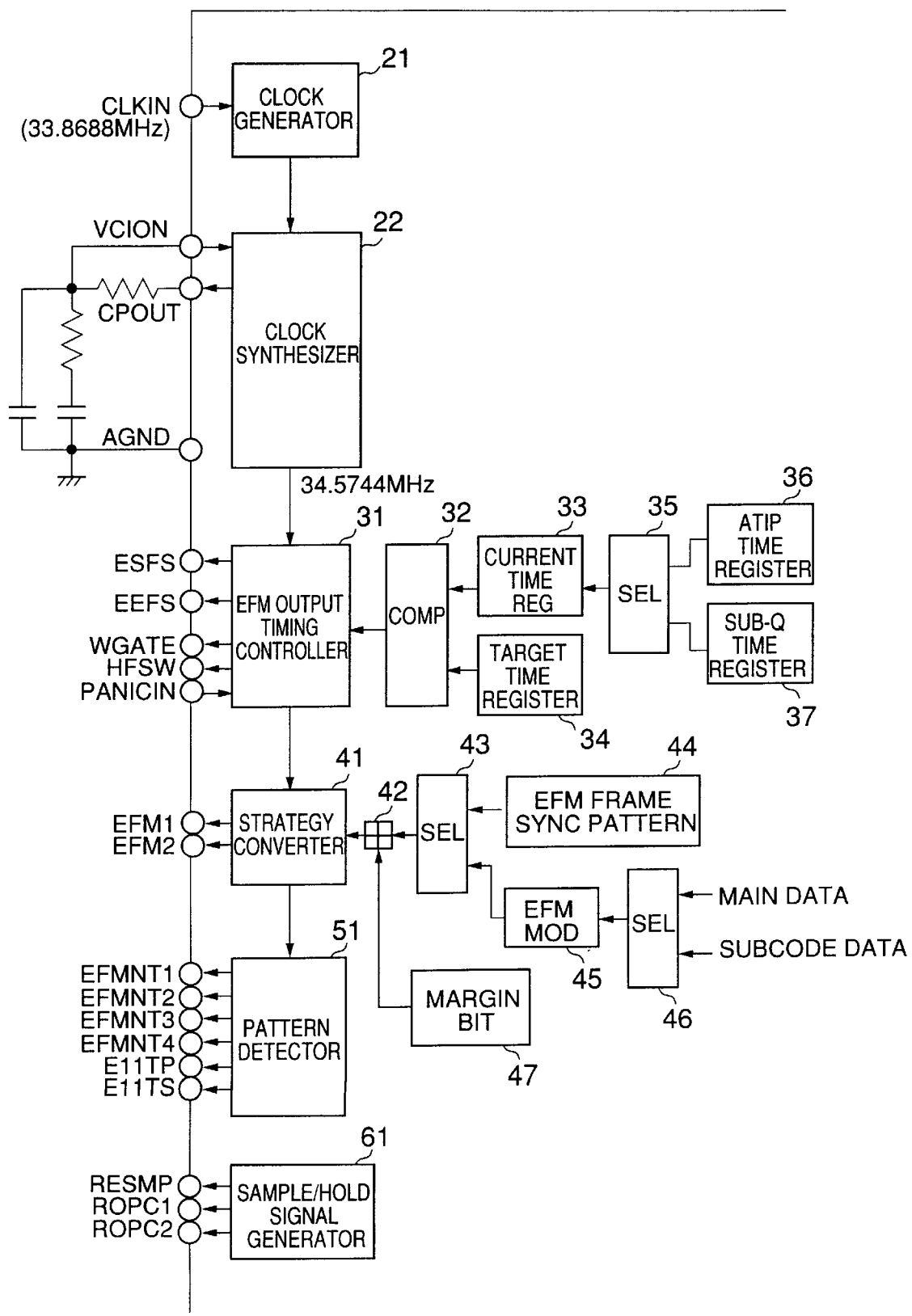
FIG. 4 is a block diagram of a CD encoder 10, a clock generator 21 and a clock synthesizer 22 shown in FIG. 2.

FIG. 4 is a block diagram of a circuit part related to the CD encoder 10, the clock generator 21 and the clock synthesizer 22 shown in FIG. 2. In FIG. 4, parts that are the same as those shown in FIG. 2 are given the same reference numbers. The circuit part shown in FIG. 4 includes an EFM output timing controller 31, a comparator 32, a current time register 33, a target time register 34, a selector 35, an ATIP time register 36, a sub Q time register 37, a strategy converter 41, an adder 42, a selector 43, an EFM frame sync pattern part 44, an EFM modulator 45, a selector 46, a margin bit part 47, a pattern detector 51 and a sample hold signal generator 61.

When the CD encode part shown in FIG. 4, that is, the CD encode device performs the encode operation, the clock synthesizer 22 generates the channel clock. The interface signals shown in FIG. 4 and some interface signals (supplied to pins of the CD encode device) shown in FIG. 2 are shown in FIG. 5.

FIG. 5 shows the contents of the interface signals supplied to the respective pins of the CD encode device. The inputting and outputting of the interface signals shown in FIG. 5 operate the CD encode device. As has already been described, the CD encode device of the present invention is characterized in that the CD decode system clock and the CD encode system clock are generated by the common oscillation element. Thus, a detailed description will be given of the clock synthesizer which generates the clocks used in the CD encode device.

Figure 6:
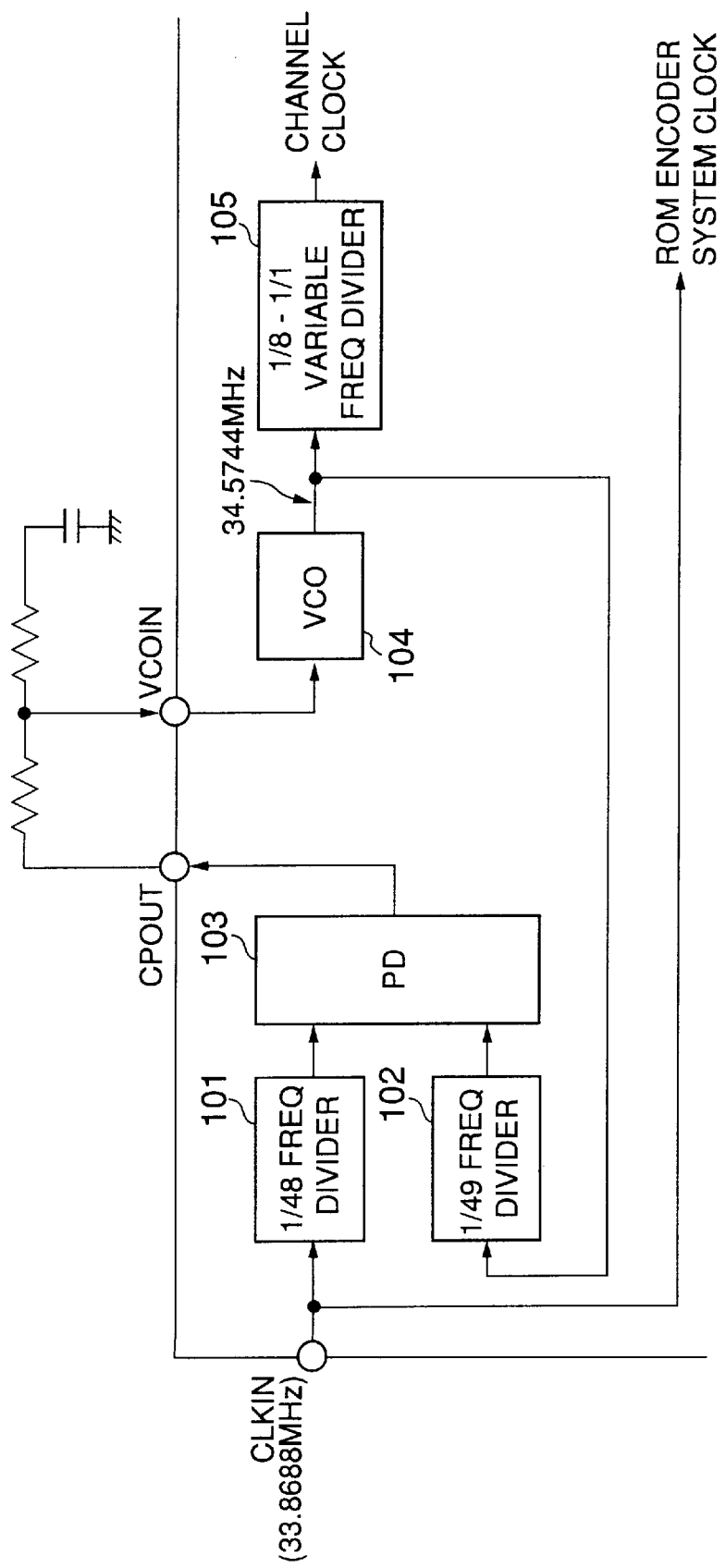
FIG. 6 is a block diagram of a clock synthesizer which generates a clock used in the CD encode device according to a first embodiment of the present invention.

FIG. 6 is a block diagram of a structure of the clock synthesizer that generates the clocks used in the CD encode device. The clock synthesizer includes a 1/48 frequency divider, a 1/49 frequency divider 102, a phase detector (PD) 103, a voltage-controlled oscillator (VCO) 104, and a variable frequency divider 105.

When a clock CLKIN used in the CD decode system is applied to the clock synthesizer, the phase detector 103 detects a phase difference between the output signal of the 1/48 frequency divider 101 and the output signal of the VCO 104, and controls the VCO 104 so that the frequency of the clock CLKIN for the CD decode system is equal to M/N times the frequency of the output clock of the VCO 104. In the structure shown in FIG. 6, M is equal to 49 and N is equal to 48. The output clock of the VCO 104 is frequency-divided by the variable frequency divider 105, which thus generates the channel clock used for the CD encode device.

More particularly, the 1/48 frequency divider 101 frequency-divides the clock CLKIN having a frequency of, for example, 33.8688 MHz and outputs a clock having a frequency equal to 1/48 times the frequency of the clock CLKIN. The VCO 104 generates the clock having a frequency of 34.5744 MHz in response to a control input signal VCOIN. The 34.5744 MHz clock generated by the VCO 104 is frequency-divided by the 1/49 frequency divider 102, which thus generates a clock having a frequency equal to 1/49 times the frequency of 34.5744 MHz.

The phase difference between the output signals of the 1/48 frequency divider 101 and the 1/49 frequency divider 102 is detected by the phase detector 103, and is fed back to the VCO 104 as a phase difference detection signal CPOUT. In the above-mentioned manner, the channel clock can be generated by detecting the phase difference by the phase detector 103 and controlling the VCO 104 on the basis of the detected phase difference.

In the configuration shown in FIG. 6, the clock generated by the VCO 104 has a frequency equal to 49/48 times the frequency of the input clock CLKIN, that is, 34.5744 MHz, which is equal to eight times the frequency of the channel clock. Hence, the 34.5744 MHz clock is a channel clock necessary for an eight-times-frequency encode operation. By dividing the eight-times-frequency clock into clocks at stepwise frequency dividing ratios by the variable frequency divider 105, a plurality of channel clocks respectively used for different recording frequencies can be obtained.

The variable frequency dividing ratio of the variable frequency divider 105 is controlled by the CPU 18 shown in FIG. 1 and is set to any of ⅛–1/1. Thus, it is possible to generate the channel clocks used for different recording frequencies of one-time-frequency encoding, two-times-frequency encoding, four-times-frequency encoding, and eight-times-frequency encoding.

When the frequency of the clock generated by the VCO 104 is set equal to 8 times, 16 times, 32 times, . . . , ($2^n$ times) the frequency of the channel clock, it is possible to generate clocks used for higher-frequency encoding.

The above-mentioned synthesizer can generate the channel clock necessary for the write operation from the CD decode system clock. Further, the synthesizer can generate channel clocks that have frequencies equal to $2^n$ times the frequency of the channel clock and are used, during the write operation, for the different recording frequencies of one-time-frequency encoding, two-times-frequency encoding, four-times-frequency encoding, and eight-times-frequency encoding by generating. That is, the present invention can cope with variable-frequency recording by a single oscillation element and can produce the CD-R drives and CD-E drives at low cost.

A description will now be given of a second embodiment of the present invention.

The above-mentioned first embodiment is directed to the CD encode device which realizes variable-frequency encoding having a frequency equal to $2^n$ times the frequency of the channel clock, such as one-time-frequency recording, two-times-frequency recording, four-times-frequency recording, eight-times-frequency recording, and so on.

In contrast, the second embodiment of the present invention is directed to a CD encode device which realizes variable-frequency encoding having a frequency equal to ($3 \times 2^n$) times the frequency o the channel clock, such as three-times-frequency recording, six-times-frequency decoding, twelve-times-frequency recording, and so on.

Figure 7:
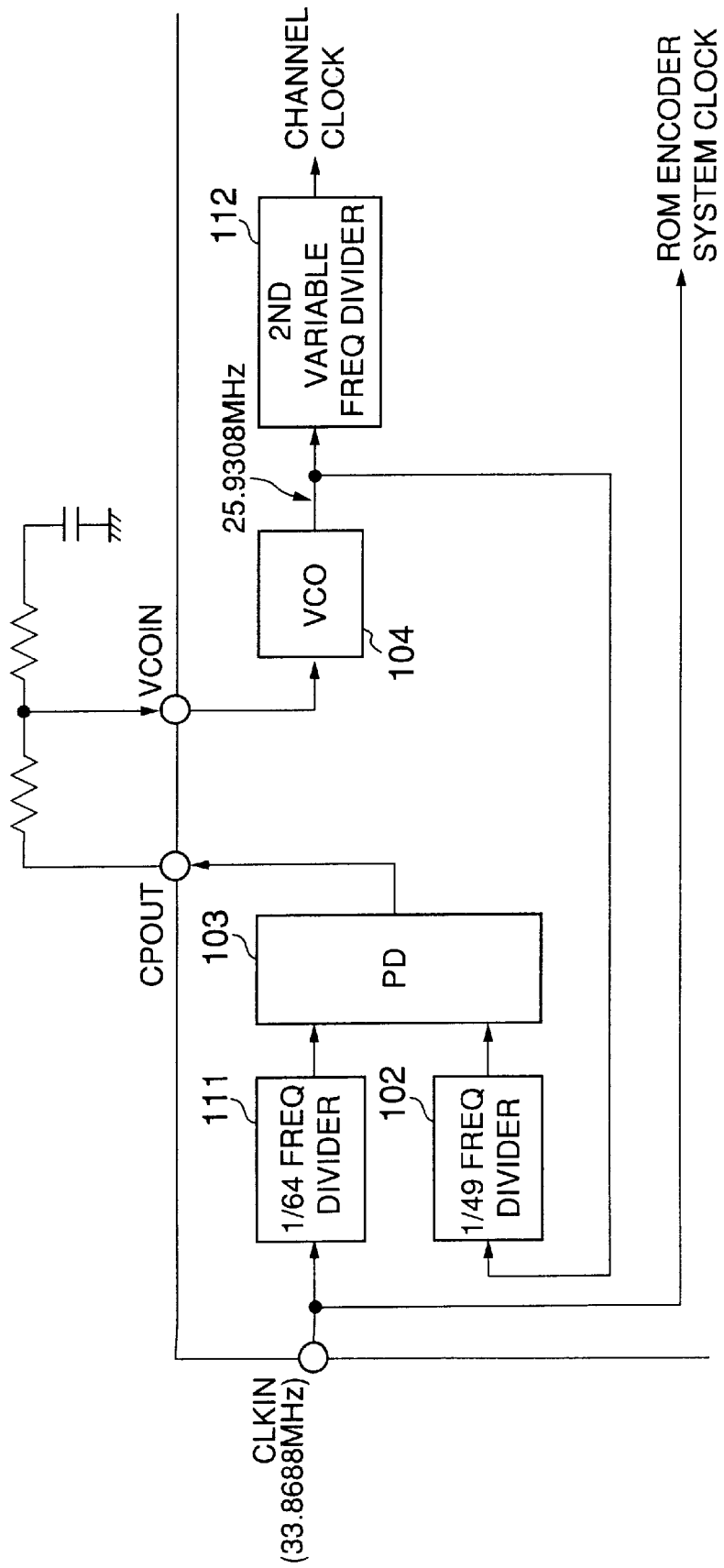
FIG. 7 is a block diagram of a clock synthesizer which generates a clock used in the CD encode device according to a second embodiment of the present invention.

FIG. 7 is a block diagram of a clock synthesizer used for the CD encode device according to the second embodiment of the present invention. In FIG. 7, parts that are the same as those shown in FIG. 6 are given the same reference numbers. The frequency synthesizer includes a 1/64 frequency divider 111 and a second variable frequency divider 112.

The basic structure of the frequency synthesizer shown in FIG. 7 is the same as that shown in FIG. 6 except for the following. The VCO 104 shown in FIG. 7 generates the clock having a frequency of 25.9308 MHz, which is divided by the second frequency divider 112 at a frequency dividing ratio ⅓ or ½. When the frequency dividing ratio ⅓ is used, the clock generated by the VCO 104 is used as the channel clock for the six-times-frequency encoding. When the frequency dividing ratio ½ is used, the clock generated by the VCO 104 is used as the channel clock for the three-times-frequency encoding.

In the above case, the frequency of the input clock CLKIN is multiplied by 49/64 times, the 1/64 frequency divider 111 is used instead of the 1/48 frequency divider 101 shown in FIG. 6.

As described above, the second embodiment of the present invention can generate the clocks having frequencies equal to ($m \times 2^n$) times the frequency of the channel clock where m is an integer other than $2^n$ and n is an integer. For example, when m=3 and n=1, the channel clock for the six-times-frequency encoding can be generated.

A description will now be given of a third embodiment of the present invention.

The write strategy in the disk writing in the CD-R/CD-E drive is defined in the so-called orange book. However, in practice, the above definition given in the orange book is insufficient to obtain the satisfactory reproduction characteristics of the drives. Thus, it is required to further perform a fine pulse width correction. Conventionally, a circuit which is to be externally connected to the one-chip LSI device is required to realize such a fine pulse width correction. This increases the production cost.

With the above in mind, the third embodiment of the present invention is characterized in that a clock which is needed during the write operation and has a frequency equal to twice that of the channel clock is generated from a clock used in the CD decode system circuit, and a write pulse is corrected with a range equal to the pulse width between the front or trailing edges of the above twice-frequency clock.

Figure 8:
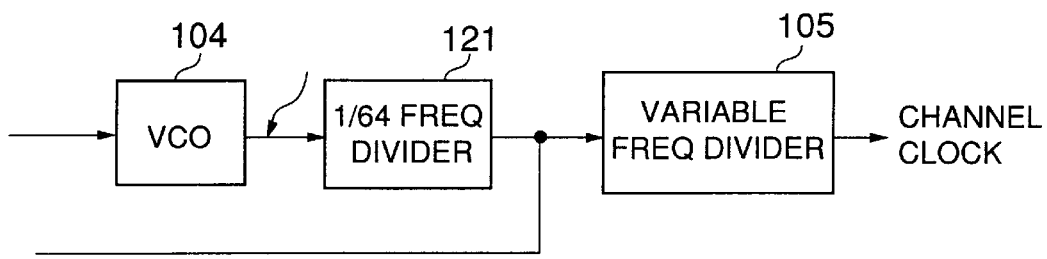
FIG. 8 is a block diagram of a clock synthesizer which generates a clock used in the CD encode device according to a third embodiment of the present invention.

FIG. 8 is a block diagram of a part of a frequency synthesizer used in the CD encode device according to the third embodiment of the present invention. In FIG. 8, parts that are the same as those shown in FIG. 6 are given the same reference numbers. As shown in FIG. 8, the frequency synthesizer according to the third embodiment is configured by interposing a ½ frequency divider 121 between the VCO 104 and the variable frequency divider 105 in the configuration shown in FIG. 6.

The VCO 104 generates the clock having a frequency equal to twice the frequency of the channel clock. The clock generated by the VCO 104 is frequency-divided by the ½ frequency divider 121 at the frequency dividing ratio of ½. Hence, the channel clock having the frequency equal to that of the signal applied to the variable frequency divider 105, that is, the 34.5744 MHz channel clock used for the eight-times-frequency encoding can be obtained, as in the case shown in FIG. 6.

When the two adjacent rising edges of the channel clock is denoted as 1T, the EFM signal generated by the one-chip LSI device shown in FIGS. 2 and 3 is made to pass through a shift register capable of shifting the signal by an arbitrary number of cycles of the clock signal having the twice frequency generated by the VCO 104, so that the EFM signal can stepwisely be shifted every 0.25T.

Figure 9:
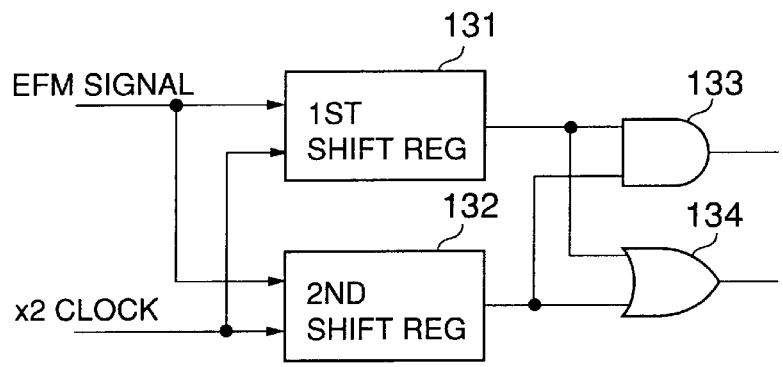
FIG. 9 is a block diagram of a pulse width correction circuit of the CD encode device according to the third embodiment of the present invention.

The above can be implemented by a pulse width correction circuit shown in FIG. 9. There are provided two shift registers, that is, a first shift register 131 and a second shift register 132, an AND gate circuit 133 and an OR gate circuit 134. Each of the first and second shift registers 131 and 132 receives the EFM signal and the twice-frequency clock generated by the VCO 104 shown in FIG. 7. Each of the output signals of the first and second shift registers 131 and 132 is applied to the AND gate circuit 133 and the NOR gate circuit 134. Hence, the pulse-width corrected EFM signals can be obtained from the AND gate circuit 133 and the OR gate circuit 134.

Figure 10:
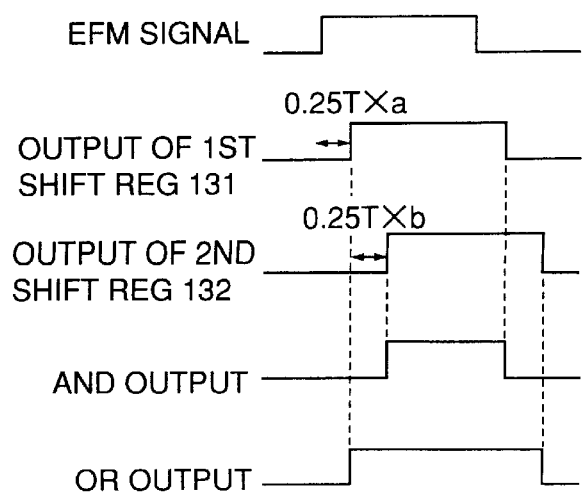
FIG. 10 is a time chart of an operation of the pulse width correction circuit shown in FIG. 9.

FIG. 10 is a time chart of an operation of the pulse width correction circuit shown in FIG. 9. The first and second shift registers 131 and 132 shift the EFM signal in synchronism with the rising and falling edges of the twice-frequency clock having the frequency equal to twice the frequency of the input channel clock. The shifted EFM signals are applied to the AND gate circuit 133 and the OR gate circuit 134, which thus generate an AND output and an OR output as shown in FIG. 10.

More particularly, the first shift register 131 delays the EFM signal by 0.25T×a, and the second shift register 132 delays the EFM signal by 0.25T×b, where a and b are arbitrary numerals. The AND output obtained by performing the AND operation on the output signals of the first and second shift registers 131 and 132 has a pulse width less than that of the EFM signal. The OR output obtained by performing the OR operation on the output signals of the first and second shift registers 131 and 132 has a pulse width greater than that of the EFM signal. Hence, the fine correction for the write strategy can be realized. That is, the CD-R/CD-E drives having improved write characteristics can be configured without an external circuit and without an increase in the CPU.

In the above description, the VCO 104 shown in FIG. 8 generates the clock having the frequency equal to twice that of the channel clock. It is also possible to make the VCO 104 generate a clock having a frequency equal to four times, eight times, . . . the frequency of the channel clock and to thus realize a finer correction.

A description will now be given of a fourth embodiment of the present invention.

The above-mentioned third embodiment of the present invention executes the pulse shift operation and the pulse width correction. Thus, the fine correction of the write pulse width can be carried out. However, the practical disk drive is required to correct the write pulse defined in the orange book in both directions in order to obtain the satisfactory characteristics after writing. That is, it is required to use a combined write strategy including a strategy for adjustment based on power determined by the pulse height and another strategy for adjustment based on the pulse width.

Figure 11:
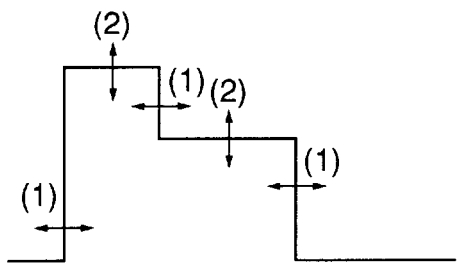
FIG. 11 is a waveform diagram showing a write pulse correction operation according to a fourth embodiment of the present invention.

FIG. 11 is a diagram of a write pulse correction operation according to the fourth embodiment of the present invention. In FIG. 11, reference numbers (1) and (2) added to arrows denote correction directions. As shown in FIG. 11, the write pulse really used requires the correction in the right and left directions indicated by arrows (1) and directions indicated by arrows (2). The correction in the directions (2) is carried out by the laser controller 9 shown in FIG. 1.

Figure 12:
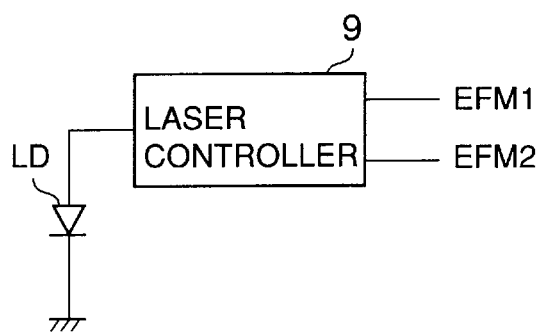
FIG. 12 is a block diagram of a circuit configuration located in the periphery of a laser controller 9 according to the fourth embodiment of the present invention.

FIG. 12 shows a circuit configuration peripheral to the laser controller 9 according to the fourth embodiment of the present invention. In FIG. 12, a symbol LD denotes a laser diode, and symbols EFM1 and EFM2 denote pulse-width-corrected EFM signals.

Figure 13:
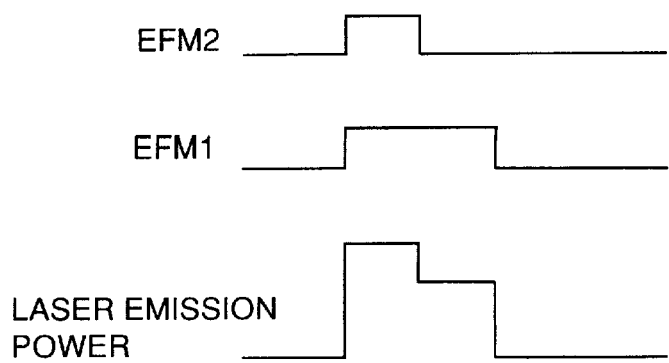
FIG. 13 is a time chart of a driving state of a laser diode shown in FIG. 12.

FIG. 13 is a time chart of an operation of the circuit shown in FIG. 12.

As shown in FIG. 12, the laser controller 9 can receive a plurality of signals EFM1 and EFM2. A one-chip LSI device capable of varying the current gains to the EFM signals and adding the currents is configured as shown in FIGS. 2 and 3.

The fourth embodiment is characterized in that two pulse width correction blocks, each being configured according to the third embodiment, are employed and two pulse-width-corrected EFM signals, namely, EFM1 and EFM2 are output.

A description will now be given of the strategy of the signal EFM1 supplied to the laser controller 9 shown in FIG. 12.

Figure 14:
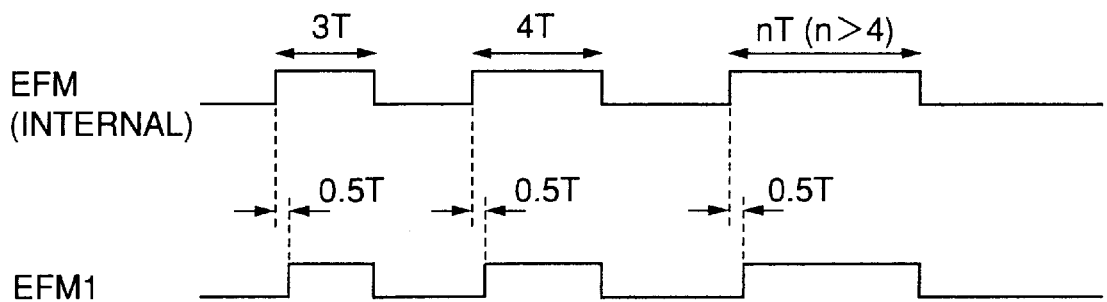
FIG. 14 is a time chart of a CD-R strategy for the signal EFM1.

FIG. 14 is a time chart of a CD-R strategy of the signal EFM1. As shown, the signal EFM1 has a unit length 0.25T and the length of the signal EFM1 can stepwisely be set within the range of (n−0.5T) to nT.

The signal EFM2 will be described below.

Figure 15:
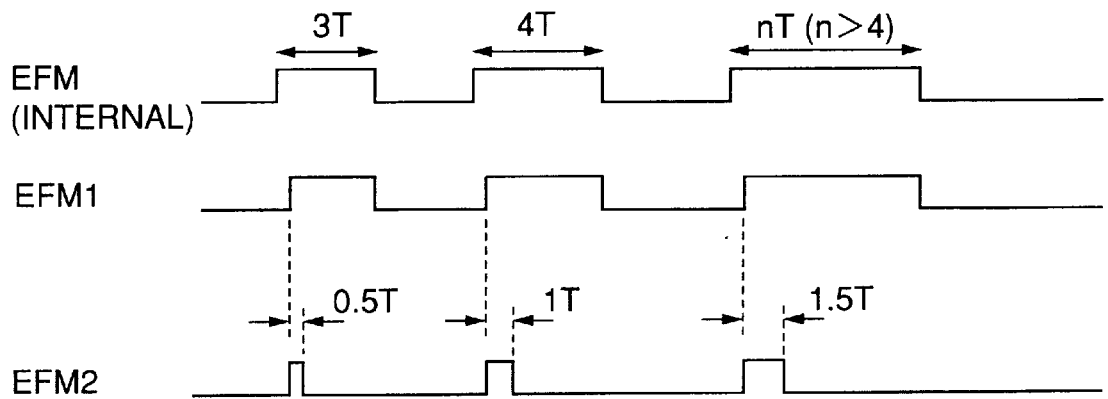
FIG. 15 is a time chart of a CD-R strategy for the signal EFM2.

FIG. 15 is a time chart of a CD-R strategy of the signal EFM2. As shown, the peak pulse width of the signal EFM2 has a unit length 0.25T and can stepwisely be set within the range of 0.5T–2T in accordance with 3T/4T of the internal signal EFM and the others.

The above setting can be done so that the strategy of the internal EFM signal is converted by the strategy converter 41 shown in FIG. 4, and is output to the terminal EFM1 or EFM2.

FIGS. 16A, 16B and 16C show an example of the signal setting output to the terminals EFM1 and EFM2 by the strategy conversion for the internal EFM signal. FIG. 16A shows the strategy conversion for the terminal EFM1 and the setting of the peal pulse width to the terminal EFM2. FIG. 16B shows the length of the signal EFM1. FIG. 16C shows the peak pulse width of the signal EFM2.

FIGS. 17A, 17B and 17C shows an example of the peak pulse width output to the terminal EFM2 by the strategy conversion for the internal EFM signal. FIG. 17A shows setting of the peal pulse width with respect pulses other than the 4T pulse and 3T/4T pulse. FIG. 17B shows the peal pulse width output to the terminal EFM2 when the signal EFM width is equal to 4T. FIG. 17C shows the peak pulse width to the output to the terminal EFM2 when the signal EFM width is equal to 5T–11T.

As shown in FIGS. 16A–16C and FIG. 7, it is possible to arbitrarily set the length of the signal EFM1 and the peak pulse width of the signal EFM2 by the strategy conversion for the internal EFM signal. In order to realize the above setting, five eight-bit registers are provided, and are arranged to addresses 0x70 to 0x71 and 0x77 to 0x79 (where 0x denotes the hexadecimal notification).

The two signals EFM1 and EFM2 can be corrected independently.

The two signals EFM1 and EFM2, that is, the control signals EFM1 and EFM2 for the write strategy are applied to the laser controller 9 shown in FIG. 1, and the laser diode is driven so that the write pulse in FIG. 13 can be obtained. The above correction can be realized by the circuit of the third embodiment of the present invention shown in FIG. 9.

Hence, according to the present invention, it is possible to provide the device having the further improved write characteristics in addition to the effects provided by the third embodiment thereof.

A description will now be given of a fifth embodiment of the present invention.

The CD-E drive is required to a more complex write strategy than the CD-R drive. Thus, in practice, it is required to more finely correct the write strategy of the fourth embodiment in order to satisfy the reproduction characteristics after writing. The aforementioned fourth embodiment has the circuit that generates the two control signals EFM1 and EFM2 for the write strategy.

In contrast, the fifth embodiment is capable of further finely correcting the control signals EFM1 and EFM2 for the write strategy.

Figure 18:
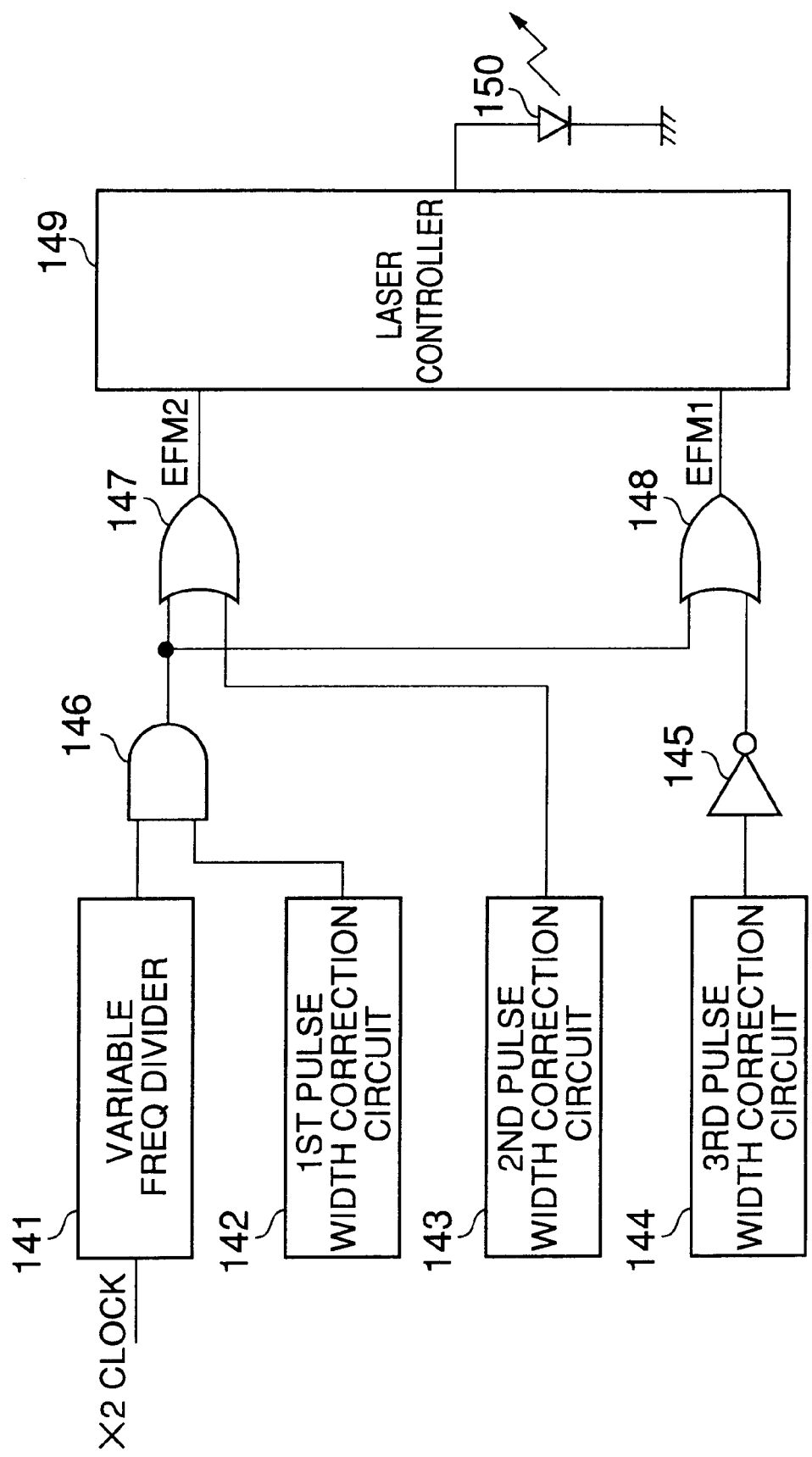
FIG. 18 is a block diagram of a pulse width correction circuit according to a fifth embodiment of the present invention.

FIG. 18 is a block diagram of a pulse width correction circuit for the CD encode device according to the fifth embodiment of the present invention. The pulse width correction circuit includes a variable frequency divider 141, a first pulse width correction circuit 142, a second pulse width correction circuit 143, a third pulse width correction circuit 144, an inverter 145, an AND gate circuit 146, OR gate circuits 147 and 148, a laser controller 149 and a laser diode 150.

Figure 19:
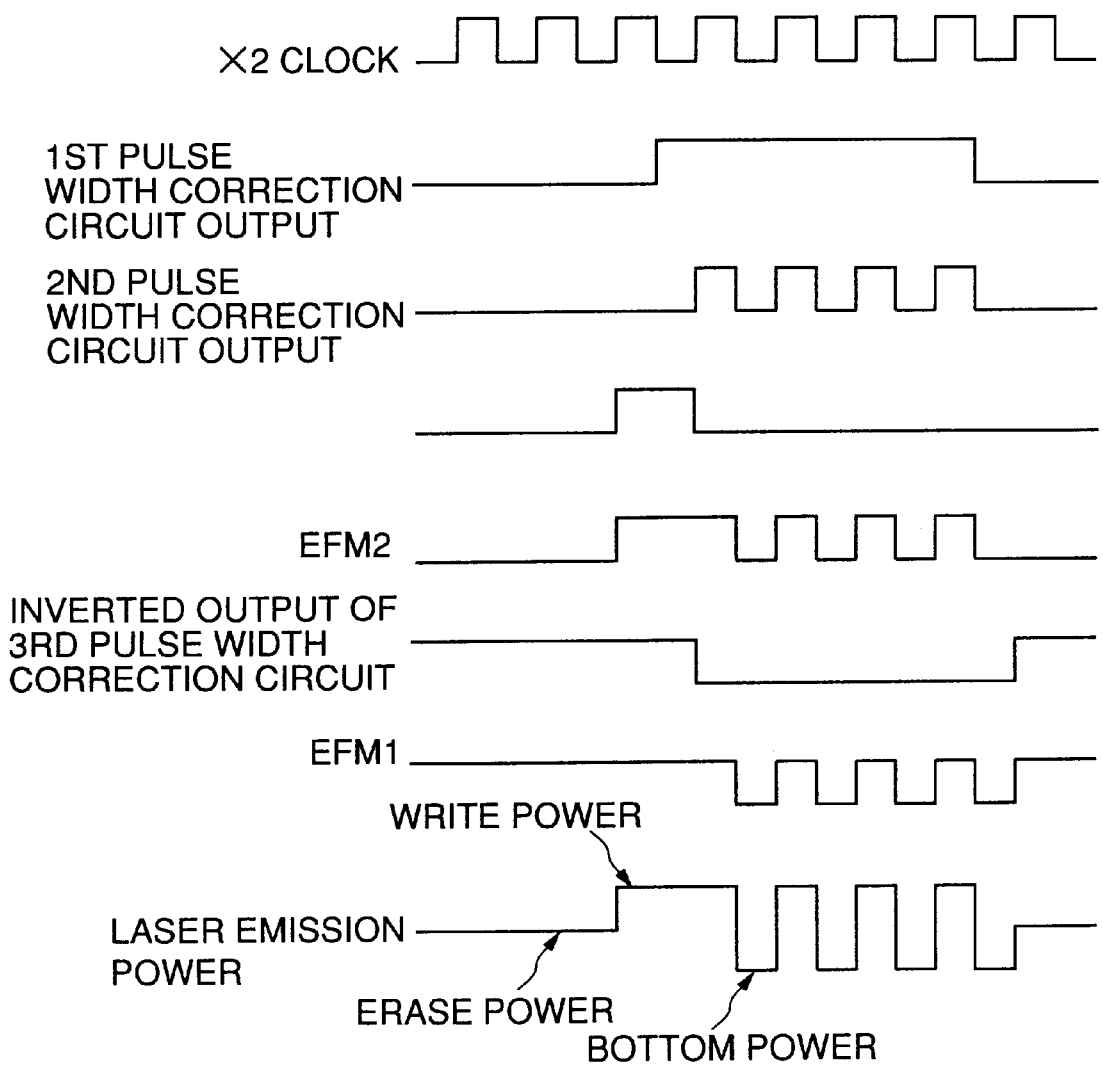
FIG. 19 is a time chart of an operation of the pulse width correction circuit shown in FIG. 18.

FIG. 19 is a time chart of an operation of the pulse width correction circuit shown in FIG. 18. The pulse width correction circuit shown in FIG. 18 can correct the pulse width every 0.25T of the peak pulse width. The pulse width of an intermediate pulse generated by an intermediate pulse generating circuit can be corrected every 0.25T. The off pulse width of the signal EFM1 can be corrected every 0.25T by the pulse width correction circuit.

Figure 20:
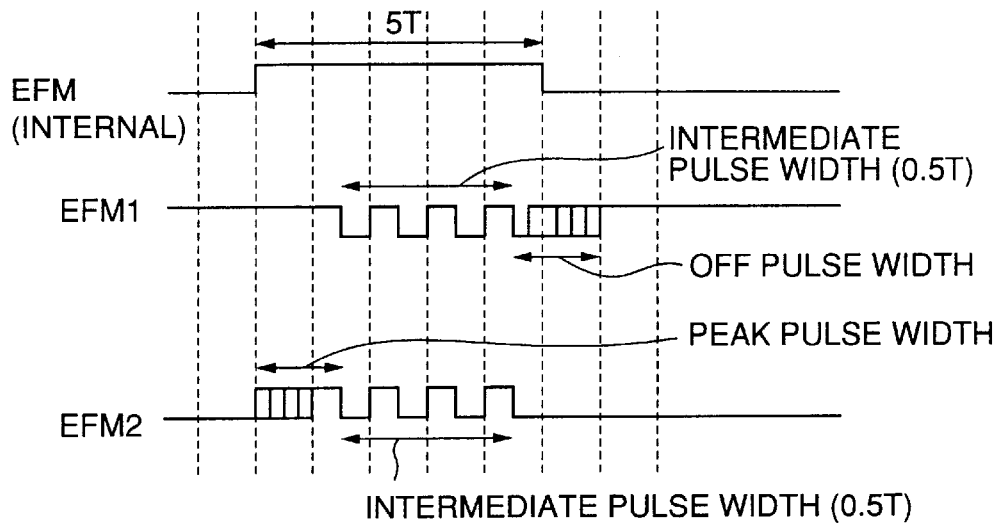
FIG. 20 is a time chart of states of the control signals EFM1 and EFM2 for the write strategy observed when the internal EFM signal is 5T.

FIG. 20 is a time chart showing the states of the control signals EFM1 and EFM2 for the write strategy obtained when the internal EFM signal is 5T. As shown in FIG. 20, when the EFM signal is 5T, the width of the intermediate pulse of the signal EFM1 and the width of the off pulse can be set every 0.25T. The peak pulse width of the signal EFM2 and the width of the intermediate pulse can be set every 0.25T.

The control signal EFM1 for the write strategy thus generated is input to the laser controller 149 as a control signal of erase power. the control signal EFM2 for the write strategy thus generated is input to the laser controller 149 as a control signal of write power. Thus, a complex write waveform that is required in the CD-E drive and is as shown in FIG. 13 can be obtained.

Figure 21:
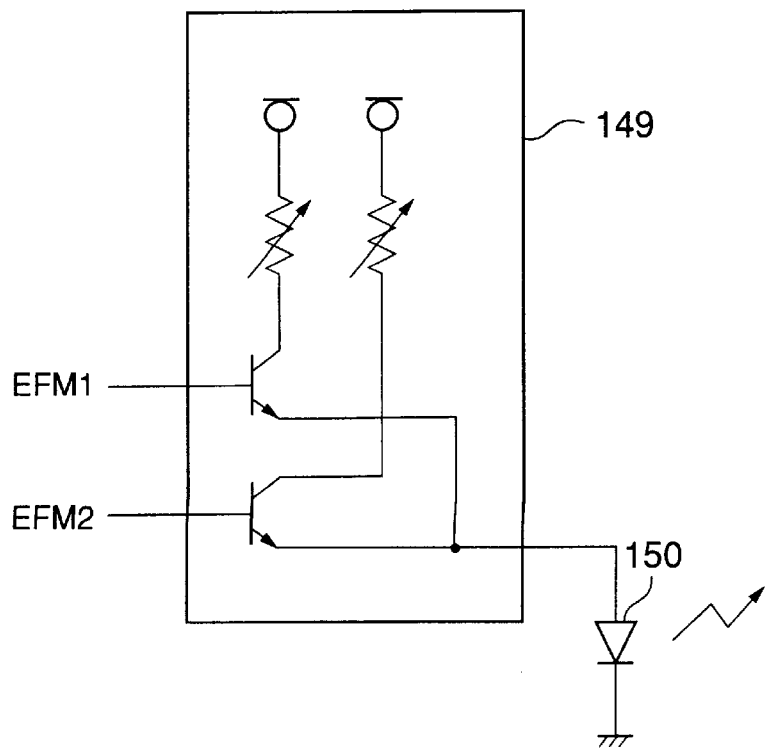
FIG. 21 is a diagram of an internal structure of the laser controller 149 shown in FIG. 18.

FIG. 21 is a diagram of an internal structure of the laser controller 149 shown in FIG. 18. In the laser controller 149 shown in FIG. 21, the resistance of the driver controlled by the control signal EFM1 for the write strategy can be adjusted to become equal to the erase power, and the resistance of the driver controlled by the control signal EFM2 can be adjusted to become equal to (peak power)−(erase power). Hence, the current equal to the sum of the output currents of the drivers can be made to flow in the laser diode 150.

A description will now be given of the strategy of the signals EFM1 and EFM2.

FIGS. 22A through 22D show an example of the peak pulse width, the intermediate pulse width and the off pulse width output by the strategy conversion when the internal EFM signal is 3T. FIG. 22A shows the setting of the peak pulse width, the intermediate pulse width and the off pulse width. FIG. 22B shows the peak pulse width, and FIG. 22C shows the intermediate pulse width. FIG. 22D shows the off pulse width.

FIGS. 23A through 23D show an example of the peak pulse width, the intermediate pulse width and the off pulse width output by the strategy conversion when the internal EFM signal is 4T. FIG. 23A shows the setting of the peak pulse width, the intermediate pulse width and the off pulse width. FIG. 23B shows the peak pulse width, and FIG. 23C shows the intermediate pulse width. FIG. 23D shows the off pulse width.

FIGS. 24A through 24D show an example of the peak pulse width, the intermediate pulse width and the off pulse width output by the strategy conversion when the internal EFM signal is 5T to 11T. FIG. 24A shows the setting of the peak pulse width, the intermediate pulse width and the off pulse width. FIG. 24B shows the peak pulse width, and FIG. 24C shows the intermediate pulse width. FIG. 24D shows the off pulse width.

As shown in FIGS. 22A through 24D, when the internal EFM signal width is 3T, 4T or 5T–11T, it is possible to set the peak pulse width, the intermediate pulse width and the off pulse width every 0.25T within the range of 0.25T to 1.5T.

As described above, according to the fifth embodiment of the present invention, the two control signals EFM1 and EFM2 for the write strategy can be corrected more finely.

The present invention is not limited to the specifically disclosed embodiments and variations and modifications may be made without departing from the scope of the present invention.

What is claimed is:

1. A CD encode device for a recordable optical disk, said CD encode device comprising a clock synthesizer for generating a channel clock for use during a write operation, said clock synthesizer being arranged to multiply the frequency of a CD decode system clock by M/N to obtain a clock having a frequency equal to $2^n$ times or $\frac{1}{2}^n$ times the frequency of the channel clock, where M, N and n are non-zero integers, such that said channel clock and said decode system clock are based on a single clock signal.

2. A CD encode device for a recordable optical disk, said CD encode device comprising:

a clock synthesizer generating a dock having a frequency equal to $2^n$ times a frequency of a channel clock required during a write operation from another clock used in a CD decode system circuit, where n is a non-zero integer; and a frequency divider which frequency-divides the clock generated by the clock synthesizer at given frequency dividing ratios, so that clocks having different frequencies are generated from a single clock signal.

* * * * *